Figure 1:
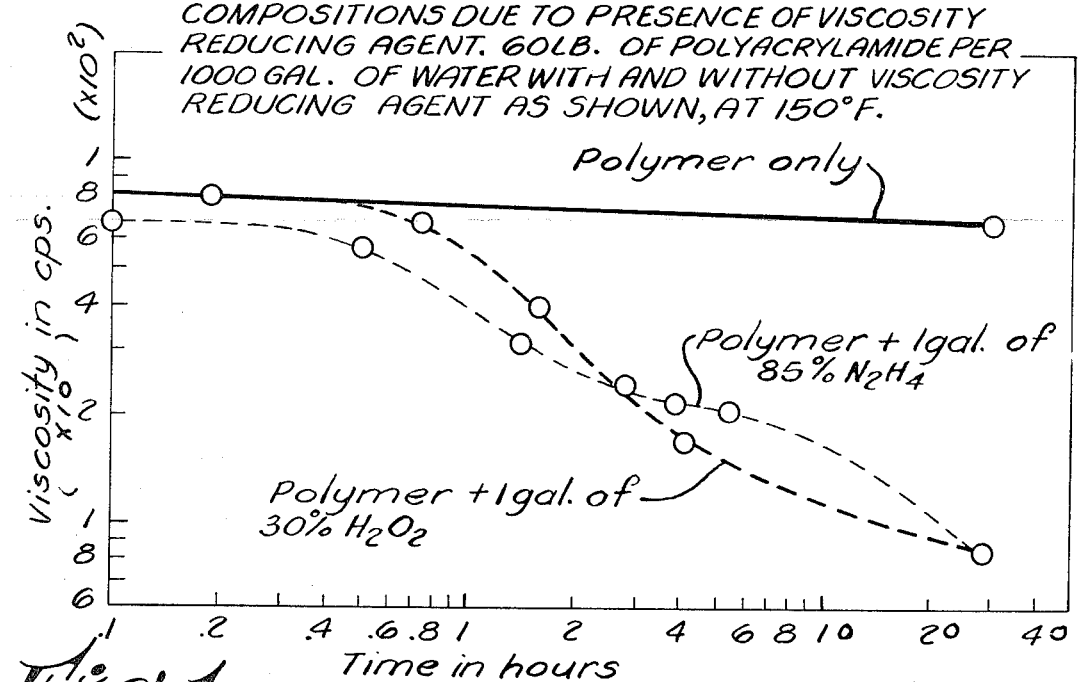

United States Patent [19]
Nimerick

[11] 3,779,914
[45] Dec. 18, 1973

[54] COMPOSITION OF IMPROVED VISCOSITY CONTROL AND METHOD OF USE

[75] Inventor: Kenneth H. Nimerick, Tulsa, Okla.

[73] Assignee: The Dow Chemical Company, Midland, Mich.

[22] Filed: May 20, 1971

[21] Appl. No.: 145,495

Related U.S. Application Data

[63] Continuation-in-part of Ser. No. 666,853, Sept. 11, 1967, abandoned.

[52] U.S. Cl............ 252/8.55 R, 166/283, 166/308, 252/316
[51] Int. Cl............................................ E21b 43/26
[58] Field of Search............................ 166/308, 283; 252/8.55 R, 320, 316

[56] References Cited
UNITED STATES PATENTS 3,167,510  1/1965  Alter..................................... 252/8.55
3,370,650  2/1968  Watanabe........................ 166/283 X
3,405,062  10/1968  Kuhn................................. 252/8.55
3,442,803  5/1969  Hoover et al..................... 252/8.55

*Primary Examiner*—Herbert B. Guynn
*Attorney*—Bruce M. Kanuch et al.

[57] ABSTRACT

An aqueous composition is provided which can be employed as a fracturing fluid, to suspend particulate solids or the like. The composition can be formulated to have a certain initial viscosity value which will decrease after a certain period of time to a value below the initial viscosity value. The composition comprises, water, a water soluble organic polymer as a viscosity increasing agent and as a breaker a hydrazine or hydroxylamine compound or a mixture of such compounds.

10 Claims, 3 Drawing Figures

INVENTOR.
Kenneth H. Nimerick

COMPOSITION OF IMPROVED VISCOSITY CONTROL AND METHOD OF USE

CROSS-REFERENCE TO RELATED APPLICATION

This application is a continuation-in-part of application Ser. No. 666,853, filed Sept. 11, 1967, now abandoned.

BACKGROUND OF THE INVENTION

Fluids exhibit a measurable property known as viscosity, a term which may be broadly defined as the internal friction or molecular attraction of a given material which manifests itself in resistance to flow. It is measured in liquids by standard test procedures and is usually expressed in poises or centipoises at a specified temperature, although in oil technology it is sometimes expressed in seconds required for a given volume to flow through a specified orifice at a definite temperature. The viscosity of a liquid is an indication of a number of behavior patterns of the liquid at a given temperature including pumping characteristics, rate of flow, wetting properties, and a tendency or capacity to suspend an insoluble particulated material therein.

The invention is concerned with intentionally and desirably varying the viscosity of a liquid so that it may at one time possess a high viscosity value, e.g., high capacity for suspending particulate materials, and at a subsequent time have a reduced viscosity value, e.g., lower capacity for suspending such materials. There are a number of industrial operations wherein it is desirable that the capacity of a liquid to suspend and later to drop out or permit settling of a particulate material suspended therein be controlled.

A particular need for such control exists in the practice of fracturing subterranean formations. A fracturing fluid (usually a liquid, although some gas may be present), having granular insoluble particulate material suspended or slurried therein, is injected down a well penetrating the formation and forced back into the formation (employing the height of the hydraulic head of the liquid to provide pressure and hence commonly known as hydraulic fracturing). Through the instrumentality of such operation, the formation is caused to crack or fracture thereby effectuating improved communication between a fluid (e.g., oil, gas, water, etc.) in the formation and the well. Fracturing is customarily conducted by employing oil, water, (sometimes in a thickened or gelled state) or an emulsion thereof which has suspended therein particles which are substantially insoluble in the liquid and the fluids of the formation, at least a portion of the particles thereby being forced to lodge in the fractures created, thus propping open the fractures when the fracturing pressures are subsequently released and the well put back in production.

To maintain a propping agent suspended in a liquid until it is lodged in a fracture presents problems since the propping agent tends to settle out as the rate of movement of the liquid, after leaving the wellbore, slackens. This sometimes occurs prematurely resulting in depositing the propping agent in the wellbore or immediately adjacent to the wellbore, causing what is known as a sand-out or a screen-out. In efforts to avoid the premature deposition of the propping agent, liquids have been used, the suspending ability of which is improved by thickening the same with a suspending agent (a viscosity increasing agent). This approach to the problem, though aiding in maintaining the propping agent in suspension for an additional time, introduces the added problem of tending to prevent the propping agent from lodging securely in the newly created fractures and to prevent the removal of the fracturing liquid from the fractures.

The use of "breakers" to reduce the viscosity of certain selected viscous water soluble organic polymeric aqueous solutions is not new. In U.S. Pat. No. 2,483,936 the viscosity of an aqueous solution of guar gum in reduced by dispersing in the solution sodium and hydrogen peroxide. In U.S. Pat. No. 3,024,191 it is asserted that the viscosity of an aqueous solution thickened with carboxymethyl cellulose can only be effectively reduced with a perborate. Further, in U.S. Pat. No. 3,167,510 the viscosity of aqueous solutions thickened with guar gum can be decreased by employing a persulfate if the solution is maintained at a temperature of at least 100°F. In U.S. Pat. No. 3,442,803 a specific polymer of acrylamide and methylenebisacrylamide is employed to increase the viscosity of aqueous solutions. The viscous solution can be broken, i.e., the viscosity decreased, by adding a water soluble persulfate or perborate thereto. However, in all of these patents a specific "breaker" was found to be effective only on a specific water soluble organic polymeric viscosity increasing agent, and in U.S. Pat. No. 3,167,510 only at an elevated temperature. IN the present invention a class of breakers have been discovered which are effective to break an aqueous solution containing one or more of a broad class of water soluble organic polymeric viscosity increasing agents.

A need clearly exists for a liquid which has an initial relatively high suspending ability, e.g., high viscosity, during injection and fracturing and thereafter within a relatively short time, autonomously converts to a liquid of relatively low suspending ability to drop out the particles and facilitate its removal from the fractures. There is also a need for plugging and diverting compositions which serve as a temporarily fluid loss agent, e.g., in thief zones, and thereafter break to a low viscosity for easy removal.

SUMMARY OF THE INVENTION

The invention is a novel composition of matter and use thereof. The composition comprises a viscous mixture of a water soluble organic polymer and water, with which is admixed an effective quantity of a compound selected from the group consisting of a water soluble hydroxylamine, hydrazine compound or mixtures thereof to decrease the viscosity of the composition after a certain period of time.

Hydrazine and hydroxylamine compounds can include any of those compounds which are sufficiently water soluble to be effective in the practice of the present invention.

Hydrazine compounds include hydrazine and water soluble hydrazine derivatives such as substituted hydrazine wherein one or more of the hydrogen atoms is replaced by, for example, an organic group, e.g., an alkyl or aromatic hydrocarbon, a metal ion; hydrazine salts such as those formed with mono basic acids, e.g., HCl and dibasic acids such as $H_2SO_4$, carboxylic acids and the like. Several well known analytical methods can be employed to determine whether a certain compound in fact forms hydrazium ions in solution. See specifically those methods taught at pp. 184 and 185 of *The Encyclopedia of Chemical Technology*, Vol. 11, 1966, 2nd Ed., said teachings being specifically incorporated herein by reference. Specific hydrazine compounds which can be employed include, for example, hydrazine monochloride, hydrazine dihydrochloride, dihydrazine disulfate, monohydrazine sulfate, hydrazine disulfate, stearic dihydrazide, succinyl dihydrazide, adipic dihydrazide, copper dihydrazinium sulfate, hydrazinium dihydrobromide, dihydrazine oxalate, hydrazinium acid adipate, zinc dihydrazine sulfate, zinc dihydrazine chloride, cobalt dihydrazine chloride, sebacic dihydrazide, zinc dithiocarbazinate, carbohydrazide, dihydrazine acid phosphate, hydrazine borate, copper hydrazinium phosphate-copper sulfate complex, copper sulfate-hydrazine bromide complex, copper sulfate-hydrazine oxalate complex, thiosemicarbazide, hydrazine adipic acid acetone complex, cinnamalazine, glyoxal-di-para-nitrophenyl hydrazine, 2,4-dinitrophenyl-hydrazine acetate, benzalazine, 2,4-dichlorobenzalazine, a-naphthalazine, hydrazinium n-butyl phosphate, hydrazinium methyl phosphate, hydrazinium isopropyl phosphate, tetrahydrazinium pyrophosphate, monohydrazine phosphate, dihydrazinium phosphate, monohydrazinium dihypophosphite, N,N'-diphenyl carbamyl hydrazide, monomethylhydrazine sulfate, 2,4-dichloro-6-(o-chloroaniline)-s-triazine, dihydrazine tartrate, zinc dimethylhydrazine chloride.

The other suitable breaker is a hydroxylamine compound which includes hydroxylamine and water soluble hydroxylamine derivatives such as, for example, ammonium--type salts formed with inorganic acids, e.g, those disclosed at page 494, Table 2 of *The Encyclopedia of Chemical Technology*, Vol. 11, 1966, 2nd Ed., and coordination complexes with metal ions such as disclosed at p. 494, Table 3 of the same *Encyclopedia*, said teachings being specifically incorporated herein by reference. The compounds listed in these aforementioned Tables 2 and 3 are:

TABLE 2 — Hydroxylammonium Salts

| Salt | Formula |
|---|---|
| chloride | $(NH_3OH)Cl$ |
| sulfate | $(NH_3OH)_2SO_4$ |
| acid sulfate | $(NH_3OH)HSO_4$ |
| phosphate | $(NH_3OH)_3PO_4$ |
| arsenate | $(NH_3OH)_3AsO_4$ |
| sulfamate | $(NH_3OH)SO_3NH_2$ |
| perchlorate | $(NH_3OH)ClO_4$ |
| iodide | $(NH_3OH)I$ |
| fluorosilicate | $(NH_3OH)_2SiF_6 \cdot 2H_2O$ |
| chlorostannate | $(NH_3OH)_2SnCl_6$ |
| aluminum sulfate | $(NH_3OH)Al(SO_4)_2 \cdot 12H_2O$ |
| ferric sulfate | $(NH_3OH)Fe(SO_4)_2 \cdot 12H_2O$ |
| chromium sulfate | $(NH_3OH)Cr(SO_4)_2 \cdot 12H_2O$ |
| magnesium sulfate | $(NH_3OH)_2Mg(SO_4)_2 \cdot 6H_2O$ |
| uranate | $(NH_3OH)_2UO_4 \cdot H_2O$ |
| ethyl sulfate | $(NH_3OH)(C_2H_5)SO_4$ |

TABLE 3 — Hydroxylamine Complex Salts

| | |
|---|---|
| $(Mg(NH_2OH)_2)Cl_2 \cdot 2H_2O$ | $(Ba(NH_2OH)_2)Cl_2$ |
| $(Ca(NH_2OH)_2)Cl_2$ | $(Hg(NH_2OH)_2)Cl_2$ |
| $(Mn(NH_2OH)_2)Cl_2$ | $(Hg(NH_2OH)_2)SO_4 \cdot H_2O$ |
| $(Co(NH_2OH)_6)Cl_3$ | $(Pd(NH_2OH)_4)Cl_2$ |
| $(Co(NH_2OH)_6)(ClO_4)_3$ | $(Pt(NH_2OH)_4)(OH)_2$ |
| $(Co(NH_2OH)_6)(CNS)_3$ | $(Pt(NH_2OH)_2(NH_3)_2)Cl_2$ |
| $(Zn(NH_2OH)_2)Cl_2$ | $(Pt(NH_2OH)_4)Cl_2$ |
| $(Zn(NH_2OH)_2)CO_3$ | $(Pt(NH_2OH)_2(py)_2)PtCl_4$ |
| $(Cd(NH_2OH)_2)Cl_2$ | $(Pt(NH_2OH)_4)Br_2$ |

In general, any hydroxylamine compound which is sufficiently soluble in water to be effective as a breaker in the practice of the present inveniton is suitable.

Methods of preparation, properties of specific hydroxylamine and hydrazine compounds and other useful information can be found at pages 164–196 and 493–508 of *The Encyclopedia of Chemical Technology*, Vol. 11, 1966, 2nd Ed., said teachings are specifically incorporated herein by reference.

Any polymer which is water-dispersible and forms a pumpable gel or otherwise viscous system having suspending properties in water may be employed in the practice of the invention. Such polymers include (1) acrylamide polymers which may be linear polyacrylamide, acrylamide polymers cross-linked with a limited amount of a cross-linking agent, and acrylamide copolymers prepared by copolymerizing acrylamide with a minor proportion of a monomer copolymerizable therewith, e.g., vinylbenzylsulfonate or vinyl-benzenesulfonate; (2) polyvinylpyrrolidone; (3) polyvinylmorpholinone; (4) cellulosic polymers and derivatives thereof; (5) natural gums such as guar, tragacanth, Irish moss, soy bean, and modified starches, e.g., those disclosed in Davidson-Sittig, *Water Soluble Resins*, pp. 13–49, 2nd Ed. (1962); and (6) water-soluble alkaline metal salts of such polymers, copolymers, and gums. For simplicity of expression all such polymeric additaments will be referred to herein merely as polymers.

The polymers degraded by the process of the invention are water-soluble or water-dispersible, resinous, high molecular weight, organic polymers, sometimes referred to as hydrophilic polymeric colloids. The term "water--soluble" as employed in the foregoing technology, means dispersible in water to provide a visually homogeneous system. Such polymers are usually essentially linear or branched in structure, but may be to some extent cross--linked so long as the polymer is effectively swollen by and uniformly dispersed in water.

Water-solubility is imparted to such polymers by incorporating in and along the polymer chain a number of hydrophilic moieties sufficient to more than offset the otherwise hydrophobic character of the organic polymer. One class of such hydrophilic moieties includes the ionizable groups. Among these are the sulfate and sulfonate acid and salt groups, carboxylate salt groups, amine and ammonium groups (the latter being inclusive of portonated forms of amines as well as quaternary derivatives of the amines, e.g., mono-, di- and trialkyl substituted ammonium salt groups), and phosphonic acid and mono- and dibasic salts thereof. Whenever acid salts are referred to, those preferred are the alkali metal, alkaline earth metal (water-soluble species thereof), and ammonium salts. The total carbons of any substituents on the nitrogen in the ammonium cations should not exceed about 12 carbons in order to insure the water-solubility of the resulting salt. Another class of hydrophilic moieties are such nonionizable groups as carboxamide, and mono- and dialkyl nitrogen-substituted carboxamides, having a total of up to about 8 carbons, and hydroxyl groups. Also of a nonionizable hydrophilic nature, though less strongly than some of the aforementioned groups are acetal, ketal, alkylene oxide, carbamate and lactam groups. In the event, the polymers employed herein contain one or more of the afore-described hydrophilic moieties and the like, in and along the polymer chain, in a sufficient amount to render the resulting polymer water-soluble, as defined above.

"Resinous," as employed to characterize the polymers, means macromolecular in size. It is otherwise apropos to characterize such polymers as being of high molecular weight. While a given minimum molecular weight would be arbitrary, especially when used to define broadly the transition point between low polymers and macromolecules, polymers are to be generally considered as having high molecular weights or being resinous for purposes herein at average molecular weights above about 100,000. In the instance of vinyl addition polymers, the resinous polymers may attain average molecular weights as great as 10 million or more.

Water-soluble resinous polymers are obtained as naturally occurring polymers or by various modifications of the naturally occurring polymers as well as by synthesis by means of addition or condensation polymerizations of appropriate monomers. Technology for preparing water-soluble polymers useful herein is known. The chemistry of many water-soluble resinous polymers applicable for use in the process of the invention will be found among the teachings concerning additional polymers obtained by ethylenic polymerization such as those described in Hedrick et al., U.S Pat. No. 2,625,529; Aimone et al., U.S. Pat. No. 2,740,522; and Booth et al., U.S. Pat. No. 2,729,557. A variety of polysaccharide derivatives are described by Gloor in U.S. Pat. No. 2,728,725. Polyurethanes and chain extended polyols will be found in Honea et al., U.S. Pat. No. 3,054,778 and Colwell et al., U.S. Pat. No. 3,020,231, respectively, and a variety of polycarbamates and lactams in Hibbard et al., U.S. Pat. No. 3,044,992; Walles et al., U.S. Pat. No. 2,946,772; Vitales, U.S. Pat. No. 2,874,124; and Fong et al., U.S. Pat. No. 3,000,830. These are to mention but a few of the well-known chemical preparations for water-soluble macromolecules or resinous polymers. The polymers concerned herein will often be otherwise identified as water-soluble organic polyelectrolytes. Further general descriptions of a variety of water-soluble resinous polymers are contained in Davidson and Sittig, *Water-Soluble Resins*, Reinhold Publishing Corp., New YOrk, 1962.

Polyacrylamides are commonly prepared by admixing, with an aqueous solution of acrylamide monomer, at substantially a neutral pH value a redox type catalyst, e.g, a persulfate of peroxide, in an amount of between about 100 and 700 parts thereof per million parts of monomer, and subjecting the resulting solution to a temperature between about 20°C and about 60°C for from about 1 to about 5 hours during which the acrylamide polymerizes to a polymer having an average molecular weight of at least about 100,000, e.g., from about 1,000,000 to 2,000,000. The polymer so made is then separated, by known techniques, e.g., evaporation, from the reaction medium and dried and particulated. Acrylamide polymers prepared in this manner have a low extent of hydrolysis and may be referred to hereinafter as Polymer A. Hydrolysis as applied to such polymers means that carboxamide groups are converted to carboxylic groups.

Polyacrylamide polymers almost invariably are hydrolyzed to some extent. A high degree of hydrolysis is sometimes desirable. The extent of hydrolysis can be increased by raising the pH value of the mixture during polymerization, e.g. by addition of NaOH. Acrylamide polymers which have a relatively higher per cent hydrolyzed carboxamide groups may be referred to herein as Polymer B.

Details on acrylamide polymers may be obtained from the literature, e.g., U.S Pat. No. 2,820,777 and a publication entitled "Separan," Forms No. 125-28-4-60, -62, and -65 published by The Dow Chemical Company, Midland, Michigan.

Cellulose ethers are prepared by first reacting alkali cellulose, in any order, with suitable amounts of a halogenated lower carboxylic acid and a hydroxyalkylating reagent or alkyl halide. By alkali cellulose is meant the reaction product of cellulose and an alkali metal hydroxide or quarternary ammonium base. Specific examples are sodium hydroxide, potassium hydroxide, and trimethyl benzyl ammonium hydroxide. Useful lower acids include monochloro-acetic acid, monochloropropionic acid, and alkali metal salts of the foregoing acids. Suitable hydroxyalkylating agents include the lower alkylene oxides such as ethylene and propylene oxides. Such oxides can be formed in situ by reaction of the appropriate chlorohydrins with an alkali hydroxide.

The alkali cellulose may be prepared prior to the etherification reaction, or prepared in situ by incorporating cellulose and alkali hydroxide into the reaction system along with one or more of the etherifying reagents. Reaction techniques of this nature are taught in U.S. Pat. Nos. 2,469,764 and 2,510,355. If desired, however, etherification of the alkalized cellulose can be carried out in the presence of an inert diluent, which promotes uniform distribution of the reactants, a condition otherwise obtained by vigorous stirring of the reaction system. Illustrating such a technique are U.S. Pat. Nos. 2,067,946; 2,517,577; 2,572,037; 2,839,526; and 3,131,176.

Cellulose fibers suitable for preparing the ethers of the invention include any appropriate cellulose raw materials such as cotton or wood pulp of a type conventionally used for etherification reactions. Such cellulose material may be used in any physical form such as bulk fibers, cellulose fiber sheets, mechanically subdivided or flocked cellulose fibers or ground cellulose fibers. Cotton linters are preferred.

A mixed carboxymethylhydroxyalkyl cellulose ether may be prepared according to a stagewise mass reaction technique. A cellulose fiber stock suitable for the preparation of cellulose ethers is incorporated into a reactor equipped with means for inducing severe agitation of the reaction mass. Cotton linters are a good starting material for this reaction but ground wood cellulose can also be used to advantage. Illustratively, suitable mixing is accomplished by introducing rotary as well as beating motion into the reaction mass. This is accomplished with counter-rotating turbines and double helical agitators. Along with the cellulose, is incorporated an alkali hydroxide such as sodium hydroxide or potassium hydroxide of a quarternary ammonium compound. Usually the base is in an aqueous solution as concentrated as is convenient for spraying it onto the cellulose fibers. At this point, if it has not already been done, the reaction is evacuated by removing oxygen. Thereafter, the carboxyalkylating reagent (e.g., chloroacetic acid) is incorporated into the alkalized reaction mass in an amount sufficient to provide a carboxyalkyl M.S of from about 0.05 to about 0.2. The hydroxyalkylating reagent is then introduced in an amount sufficient to produce a hydroxyalkyl substitution of at least from about 1.5 to as much as about 5. The carboxyalkylating reagent is again added in an amount sufficient to produce a product with a total carboxyalkyl M.S. in the range of from about 0.2 to about 1.2. The additions of the etherifying reagents are accomplished at reactor temperatures within the range of from about 30°C to about 80°C.

The reaction mass is then dried as a basic product at a temperature below about 140°F to a residual moisture content of less than about 25 per cent, preferably to less than about 16 per cent, by weight of the reaction mass. The dried product may then be ground, if a finer particulate state is desired.

It is, therefore, seen that methods of preparing the polymers useful in the practice of the invention are well known.

The exact amount of the viscosity increasing or suspending agent employed will depend on the desired initial viscosity of the aqueous solution. The desired viscosity depends in turn on the particular use of the composition. Simple laboratory procedures can be employed to establish the amount of any particular viscosity increasing agent required to give a desired viscosity. Temperature can effect the viscosity and should be taken into consideration in determining the effectiveness of the viscosity increasing agent.

The amount of "breaker" employed will determine, at the temperature of use of the composition, the time required to decrease the viscosity of the composition to a certain value. Again simple laboratory tests should be conducted to establish the amount of breaker required to decrease the viscosity of a specific composition to a certain value, within a certain period of time, at a certain temperature. It has been found that the breakers of the present invention are generally more active at higher temperatures. Therefore, as a general rule, a lesser amount of the breaker is required when the composition is to be subjected to higher temperature.

The following examples illustrate the practice of the present invention and further show simple laboratory procedures which can be employed to design specific compositions to have characteristics, i.e., initial viscosity at a certain temperature, amount of breaker required to decrease the viscosity of the composition to a certain value within a certain period of time, and the like.

In U.S. Pat. No. 3,024,191 (discussed earlier) certain curves were established to show amounts of sodium perborate which should be used if a viscosity of at least 30 centipoise is to be retained for one, two or three hours, at any specified temperature. A viscosity of 30 centipoise was chosen since it was determined that a dispersion of CMC more viscous than this was required to support large propping agents. The amount of viscosity increasing agent required to provide a composition which will support a particular size particle will depend on the exact agent employed. However, this can be easily established for any desired agent. Likewise, curves such as disclosed in U.S. Pat. No. 3,024,191 can be established for any particular combination of breaker and viscosity increasing agent within the scope of the present invention. This is helpful in selecting the required amount of breaker required to be employed in any specific situation.

Generally, in the practice of the invention, a small but effective concentration of the polymer, e.g. one which results in an initial viscosity of the aqueous dispersion at the temperature concerned, of not less than about 10, and not appreciably greater than about 5,000 centipoises is used. This viscosity is determined by using a Fann viscosimeter at a temperature of 25°C at 100 rpm. Specific situations may require higher or lower viscosity requirements. Operable concentrations will depend on the particular polymer employed and in general ranges from less than about 0.1 to about 2.0, or greater, per cent by weight of the aqueous composition. For practical purposes, the amount employed is sometimes calculated as weight of polymer per specified volume of composition, e.g., between about 10 pounds and about 150 pounds of polymer per 1,000 gallons of the resulting aqueous composition. Between about 20 and 50 pounds of polymer per thousand gallons of aqueous composition are usually recommended for fracturing uses.

The viscosity reducing agent required by the invention, e.g, hydrazine, hydroxylamine, etc., is usually employed in a sufficient amount to reduce the critical viscosity of the composition to a value of 15 centipoise or less within a period of no longer than about 72 hours. Generally, between about 0.03 and 20 parts by weight per 100 parts by weight of polymer present in the liquid composition is sufficient depending upon polymer concentration, type of polymer, and exact agent employed. The viscosity reducing agent employed according to the invention is more active at higher temperatures and, accordingly, lesser amounts are necessary at higher temperatures.

Example 1

In all the examples a Fann viscosimeter at 100 rpm was employed to establish the viscosities shown.

Figure 2:
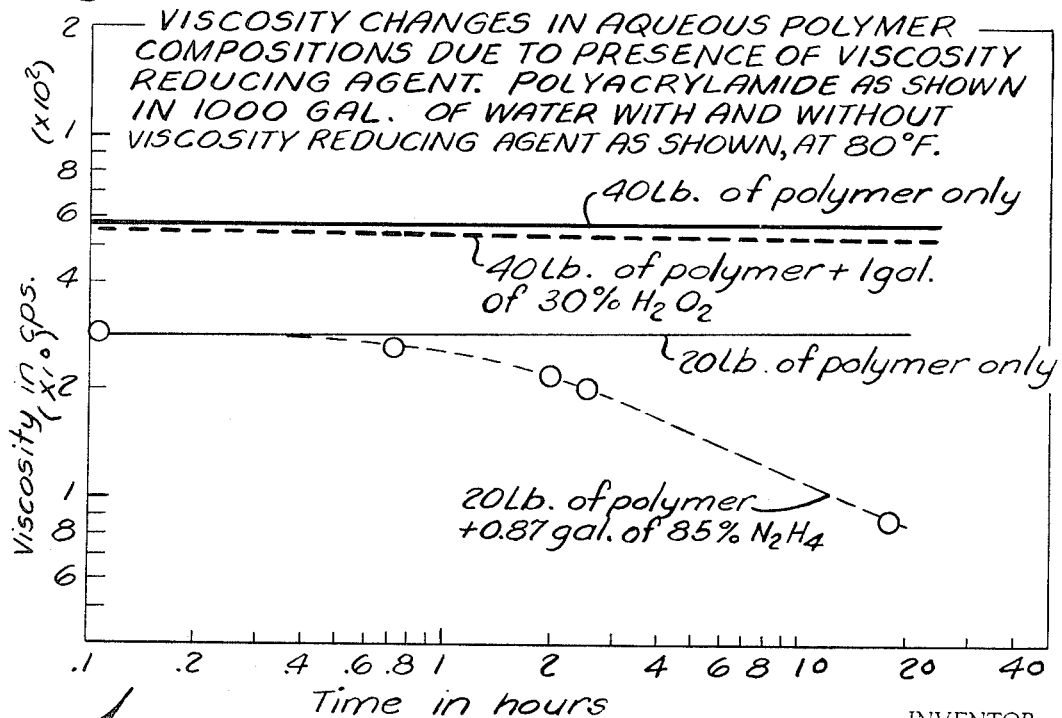

The tests depicted in the graphs were conducted by employing an acrylamide polymer designated Polymer B above. FIGS. 1 and 2 of the drawing, annexed hereto, show graphically the effect of admixing the viscosity reducing agent with an aqueous polymer composition, as illustrated by hydrazine and by hydrogen peroxide in accordance with the invention.

The polymer so prepared was admixed with water in the amount of 60 pounds polymer per 1,000 gallons of water.

For comparative purposes, the initial viscosity of the aqueous polymer dispersion at 150°F was ascertained. After about 28 hours, the viscosity was again measured. The values were plotted on FIG. 1 as a solid line. To illustrate the practice of the invention, a gallon of 30 percent by weight hydrogen peroxide in water was added to a second 1,000-gallon portion of the aqueous polymer dispersion. Six viscosity values thereof were also ascertained at 150°F over a period of 28 hours. The results are plotted on FIG. 1 as a heavy broken line.

A gallon of 85 percent by weight hydrazine in water was then admixed with a third 1,000-gallon portion of the aqueous polymer dispersion and six viscosity values thereof ascertained at 150°F over a period of 28 hours. The results thereof are also plotted on FIG. 1 as a thin broken line.

Reference to FIG. 1 shows that the viscosity of the aqueous polymer dispersion, containing no further additive for comparative purposes, had substantially the same viscosity over the 28-hour period. In marked contrast thereto the aqueous polymer dispersion containing either the hydrazine or hydrogen perioxide showed a desirable drop in viscosity at 150°F after one half hour which became more abrupt after about 1 hour and which continued to drop with some gradual variations so long as viscosity values were taken. Indications are, by extrapolation, that the viscosity continued to drop further with additional time until it approached that of the composition without the polymer (due to the gradual degradation of the polymer by the additament).

Example 2

In this series of tests, polyacrylamide, prepared as described, was admixed with water in the amount of 20 pounds of polymer per 1,000 gallons of water. An initial viscosity value and a viscosity value after about 24 hours were obtained thereon. The results are plotted as a solid line in FIG. 2. To a second 1,000-gallon portion of the aqueous polymer dispersion so prepared was admixed 0.87 gallon of 85 percent by weight hydrazine in water at 80°F. An initial viscosity value and values through 24 hours at 80°F were obtained thereon and the results plotted as a thin broken line in FIG. 2.

A third aqueous polymer dispersion was prepared by admixing polyacrylamide in water in the amount of 40 pounds of polyacrylamide per 1,000 gallons of water, Initial and 24 hour viscosity values were obtained and recorded as a solid line in FIG. 2. A fourth aqueous polymer dispersion was prepared like the third except 1 gallon of 30 percent by weight hydrogen peroxide in water was admixed therewith. Viscosity values were obtained at 80°F and the results plotted as a thin broken line in FIG. 2.

The results, as plotted on FIG. 2, show that hydrazine is highly effective as a viscosity reducing agent at 80°F, effectuating significant reduction after about three-fourths of an hour and more marked reduction after about 2 hours. It also shows that the viscosity, of the polymer dispersion only, as was shown in FIG. 1, also remains substantially constant in the absence of either hydrazine or hydrogen peroxide. FIG. 2 further shows that the hydrogen peroxide, in contrast to Series One (run at 150°F), is relatively ineffective at 80°F. as a viscosity reducer.

Example 3

In this series of tests, guar gum (also designated broadly as a polymer) was admixed with water in the amount of 60 pounds of gum per 1,000 gallons of water. An initial viscosity value was taken on the gum-thickened composition, so made, and is shown in FIG. 3.

Thereafter, four 1,000-gallon portions of the gum-thickened water were selected for testing. Two 1,000-gallon portions were maintained at a temperature of 80°F and the other two 1,000-gallon portions were heated to and maintained at 150°F. With one of the portions at 80°F and one of the portions at 150°F were admixed two gallons of 30 percent by weight hydrogen peroxide in water. Viscosity values were taken at about 0.5 hour after the admixtures were made and again after 24 hours. Results are shown in FIG. 3 wherein the viscosity results of the two thickened water portions without viscosity reducing agent are plotted as solid lines and the values of those containing the hydrogen peroxide as a heavy broken line. The temperatures employed are indicated on the respective curves.

Figure 3:
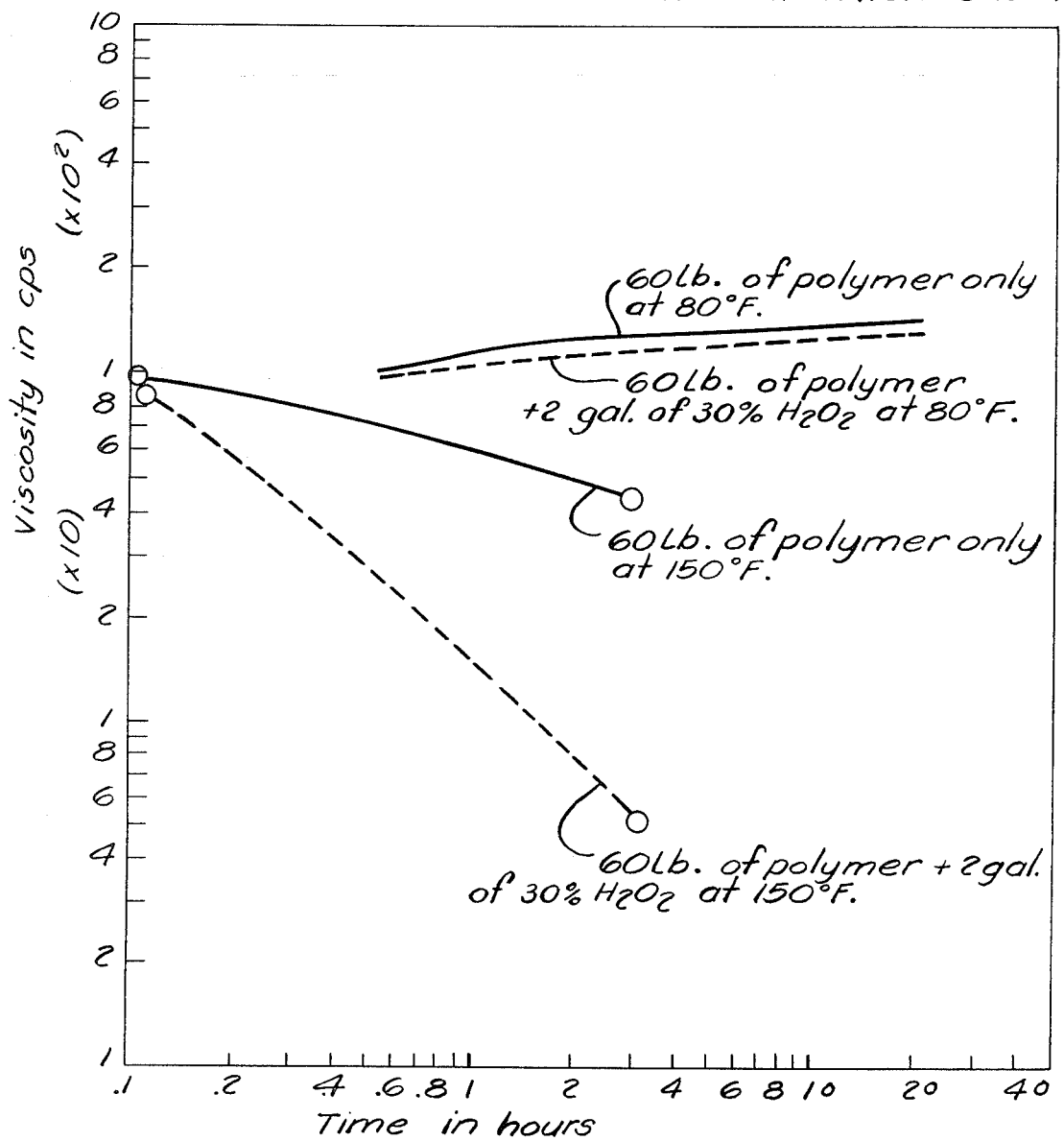

The data from these three Examples plotted in FIGS. 1, 2 and 3, demonstrate that the practice of the invention provides a way of increasing the viscosity and hence the capacity to suspend particulate materials, of an aqueous liquid by admixing with such liquid a polymer or natural gum in an amount sufficient to increase the viscosity to the desired value and the viscosity can be made to lessen within a short time by the presence of a selected viscosity reducer, according to the invention of which hydrazine is illustrative, thereby autonomously decreasing the viscosity to a desirably low value so that such liquid may be readily removed from confining spaces such as fractures in rock and underground geological formations.

Further examples of the practice of the invention follow:

Example 4

An acrylamide polymer prepared according to the procedure and described above as Polymer B was admixed with water in an amount of 30 pounds of the polymer per 1,000 gallons of water. For convenience in calculation, 30 pounds of polymer per 1,000 gallons of water is about 0.36 per cent of polymer by weight. Accordingly, 5 pounds of viscosity reducer, when employed, is about 0.06 percent thereof by weight. Mixing was continued until the polymer was completely dispersed. Viscosity was measured at that time employing a Fann viscosimeter at 100 rpm, as above, and found to be 49.0.

With equal size portions of the aqueous polymer dispersion so made were then admixed the various viscosity reducing agents named and in the amounts shown in Table I, except in Test a which contained no additive for comparative purposes. Viscosity values were obtained on the freshly made polymer compositions containing the additive and thereafter periodically after the lapse of the hours set out in the tables under which viscosity values appear.

TABLE I.—EFFICACY OF VARIOUS VISCOSITY REDUCING AGENTS ON AQUEOUS POLYMER B DISPERSIONS AT 80° F. ACCORDING TO THE INVENTION

| Test identification | Additive used in lb. per 1,000 gallons of water | Viscosity in centipoises after—* | | | | | |
|---|---|---|---|---|---|---|---|
| | | 1 hr. | 2.5 hrs. | 4 hrs. | 24 hrs. | 48 hrs. | 72 hrs. |
| a | None | 49 | 49 | (**) | 48 | | 48.4 |
| 1 | Potassium Permanganate 5 | 30.0 | 20.0 | | 9.6 | | 4.0 |
| 2 | Potassium Permanganate 1 | | | 17.1 | 8.4 | 7.2 | |
| 3 | Potassium Periodate 5 | 49.0 | 45.0 | | 4.2 | | |
| 4 | Potassium Periodate 1 | | | 46.5 | 6.6 | 3.6 | |
| 5 | Potassium Periodate 0.5 | 48.0 | | 34.2 | 4.6 | | |
| 6 | Ammonium Persulfate 5 | 41.4 | 40.8 | | 39.2 | | 13.8 |
| 7 | Hydrazine Sulfate 5 | 39.0 | 29.0 | | 9.6 | | 3.0 |
| 8 | Hydrazine Sulfate 1 | | | 48.0 | 31.5 | 20.0 | |
| 9 | Hydrazine 3.6 | 45.0 | 43.8 | | 36.6 | | 15.6 |
| 10 | Hydrogen Peroxide 2 | 45.0 | 43.8 | | 38.2 | | 10.2 |

*The initial viscosity of the polymer dispersion before adding the additive was 49 centipoises.
**A dash indicates that no viscosity value was obtained at that time interval.

Reference to Table I shows the efficacy of the viscosity reducers employed in the tests, to lower viscosity autogenously of polymer dispersions or solutions according to the invention, although practiced at the relatively low temperature of 80°F. Some of the additives perform better than others, e.g., potassium permanganate, even at only 1 pound per 1,000 gallons, and potassium periodate even at only 0.5 pound per 1,000 gallons, give exceptionally good results.

In general, better results are obtained when 5 pounds of additive per 1,000 gallons are employed than when only 0.5, 1 or 2 pounds are employed.

Example 5

The series of tests of Example 4 were repeated except that all the tests were conducted at 150°F. The initial viscosity at 150°F prior to addition of additive was 38.4 cps. The results are shown in Table II.

Reference to Table II shows that the viscosity reducing agents employed in Example 5 according to the invention are even more effective at 150°F than at the 80°F temperature of the examples of Example 4.

Example 6

The procedure of Examples 4 and 5 was followed in this series of tests, employing the same type of polyacrylamide polymer but wherein the amount of polymer, the temperature, and the type and amount of viscosity reducing agent, according to the invention, were varied, as set out in Table III, infra.

TABLE II.—EFFICACY OF VARIOUS VISCOSITY REDUCING AGENTS ON AQUEOUS POLYMER B DISPERSIONS AT 150 °F ACCORDING TO THE INVENTION

| Test identification | Additive used in lb./1,000 gallons of water | Viscosity in centipoises after—* | | | | |
|---|---|---|---|---|---|---|
| | | 1 hr. | 2 hrs. | 4 hrs. | 24 hrs. | 48 hrs. |
| b | None | 38.4 | 36.9 | (**) | 36.6 | 36.0 |
| 11 | Hydrogen Peroxide, 5 | 27.6 | 22.8 | | 12.0 | |
| 12 | Hydrazine, 5 | 21.6 | 14.1 | | 3.0 | |
| 13 | Hydrazine, 1 | | | 21.3 | 6.9 | 6.3 |
| 14 | Sodium Peroxide, 5 | 27.3 | 19.2 | | 7.2 | |
| 15 | Hydrazine Sulfate, 5 | 21.3 | 18.6 | | 3.6 | |
| 16 | Hydrazine Sulfate, 1 | | | 12.6 | 4.2 | |
| 17 | Ammonium Persulfate, 5 | 3.9 | 3.0 | | | |
| 18 | Ammonium Persulfate, 1 | | | 3.6 | | |
| 19 | Sodium Chromate, 5 | 29.7 | 29.1 | | 9.0 | |
| 20 | Potassium Iodate, 5 | 3.0 | | | | |
| 21 | Potassium Permanganate, 5 | 4.2 | 3.6 | | | |
| 22 | Hydroxylamine Hydrochloride, 5 | 27.0 | 24.9 | | 3.0 | |
| 23 | Hydroxylamine Hydrochloride, 1 | | | 22.2 | 7.2 | 6.9 |
| 24 | Sodium Perborate, 1 | | | 27.0 | 11.1 | 9.6 |
| 25 | Calcium Hypochlorite, 5 | | | 25.8 | 12.9 | 12.0 |

*The initial viscosity before adding the additive was 38.4 cps.
** A dash indicates that no viscosity value was obtained at that time interval.

TABLE III.—EFFICACY OF VARIOUS VISCOSITY REDUCING AGENTS ON AQUEOUS POLYMER B DISPERSIONS AT 80°F OR 150°F WHEREIN THE CONCENTRATION OF THE POLYMER AND THE RATIO OF VISCOSITY REDUCING AGENT (ADDITIVE) ARE VARIED

| Test identification | Polymer used in lb./1000 gallons of water | Additive in pounds per 1000 gallons of water | Ratio of polymer to additive by weight | Temperature in °F | Viscosity in cps after— | | | |
|---|---|---|---|---|---|---|---|---|
| | | | | | 1 hr. | 3 hrs. | 24 hrs. | 48 hrs. |
| c | 30 | None | | 80 | *48 | | 51 | 48 |
| 26 | 30 | 0.5 Potassium Periodate | 60 | 80 | 51.6 | | 14.0 | 8.4 |
| 27 | 30 | 0.25 Potassium Periodate | 120 | 80 | 49.2 | | 20.4 | 8.6 |
| 28 | 30 | 0.1 Potassium Periodate | 300 | 80 | 48.0 | | 27.0 | 12.0 |
| 29 | 30 | 5 Hydrazine Sulfate | 6 | 80 | 39.0 | | 9.6 | |
| 30 | 30 | 1 Hydrazine Sulfate | 30 | 80 | | | 31.5 | 20.0 |
| 31 | 30 | 5 Ammonium Persulfate | 6 | 80 | 41.4 | | 34.2 | |
| d | 70 | None | | 80 | **144.6 | 140.4 | 140.0 | 130.0 |
| 32 | 70 | 5 Potassium Periodate | 14 | 80 | 114.0 | 103.0 | 12.0 | 4.0 |
| 33 | 70 | 1 Potassium Periodate | 70 | 80 | 133.2 | 114 | 18.0 | 5.0 |
| 34 | 70 | 0.5 Potassium Periodate | 140 | 80 | 126.0 | | 37.8 | 25.2 |
| 35 | 70 | 0.25 Potassium Periodate | 280 | 80 | 131.0 | | 63.0 | 54.0 |
| 36 | 70 | 10 Hydrazine Sulfate | 7 | 80 | 118 | | 75.2 | 75.0 |
| 37 | 70 | 5 Hydrazine Sulfate | 14 | 80 | 134.4 | 135.0 | 126.0 | 111.8 |
| 38 | 70 | 10 Ammonium Persulfate | 7 | 80 | 122.0 | | 87.6 | 65.0 |
| 39 | 70 | 5 Ammonium Persulfate | 14 | 80 | 135.0 | 126.0 | 109.0 | 57.0 |
| 40 | 70 | 10 Potassium Bromate | 7 | 80 | 129.0 | | 121.0 | 117.0 |
| 41 | 70 | 5 Potassium Bromate | 14 | 80 | 138.6 | 131.0 | 126.0 | 124.6 |
| e | 30 | None | | 150 | ***39.6 | | 39.6 | 38.7 |
| 42 | 30 | 5 Potassium Periodate | 6 | 150 | 2.4 | | | |
| 43 | 30 | 1 Potassium Periodate | 30 | 150 | 2.4 | | | |
| 44 | 30 | 0.5 Potassium Periodate | 60 | 150 | 2.4 | | | |
| 45 | 30 | 0.1 Potassium Periodate | 300 | 150 | 22.8 | | 8.1 | 6.3 |
| 46 | 30 | 0.05 Potassium Periodate | 600 | 150 | 27.6 | 18.0 | 16.2 | 16.0 |
| 47 | 30 | 0.01 Potassium Periodate | 3000 | 150 | 36.3 | | 34.2 | 31.2 |
| 48 | 30 | 0.5 Ammonium Persulfate | 60 | 150 | 15.6 | | 2.4 | |
| 49 | 30 | 0.1 Ammonium Persulfate | 300 | 150 | 27.9 | | 4.2 | |
| 50 | 30 | 0.05 Ammonium Persulfate | 600 | 150 | 30.6 | 26.4 | 13.8 | 13.2 |
| 51 | 30 | 0.5 Hydrazine Sulfate | 60 | 150 | 28.5 | | 3.6 | |

TABLE III.—Continued

| Test identification | Polymer used in lb./1000 gallons of water | Additive in pounds per 1000 gallons of water | Ratio of polymer to additive by weight | Temperature in °F | Viscosity in cps after— | | | |
|---|---|---|---|---|---|---|---|---|
| | | | | | 1 hr. | 3 hrs. | 24 hrs. | 48 hrs. |
| 52 | 30 | 0.1 Hydrazine Sulfate | 300 | 150 | 33.0 | | 10.2 | 7.2 |
| 53 | 30 | 0.05 Hydrazine Sulfate | 600 | 150 | 28.8 | 26.4 | 15.3 | 12.3 |
| 54 | 30 | 5 Potassium Bromate | 6 | 150 | 32.4 | | 30.0 | |
| f | 70 | None | | 150 | ****102.0 | | 102.0 | 102.0 |
| 55 | 70 | 1 Potassium Periodate | 70 | 150 | 12.9 | | 6.0 | |
| 56 | 70 | 0.25 Potassium Periodate | 280 | 150 | 28.6 | | 19.2 | 18.0 |
| 57 | 70 | 5 Hydrazine Sulfate | 14 | 150 | 87.0 | | 13.2 | 6.6 |
| 58 | 70 | 1 Hydrazine Sulfate | 70 | 150 | 93.0 | | 14.7 | 6.9 |
| 59 | 70 | 0.25 Hydrazine Sulfate | 280 | 150 | 99.0 | | 33.3 | 15.9 |

*The initial viscosity of 30 pounds of polymer per 1000 gallons water at 80°F was 49.5 cps.
**The initial viscosity of 70 pounds of polymer per 1000 gallons water at 80°F was 144.6 cps.
***The initial viscosity of 30 pounds of polymer per 1000 gallons of water at 150°F was 38.2 cps.
****The initial viscosity of 70 pounds of polymer per 1000 gallons of water at 150°F was 99.0 cps.

Reference to Table III shows that the oxidizing agents and amine compounds herein used are effective at a ratio of polymer to viscosity reducer varying between 6 and 3,000 to lower the viscosity of aqueous polymer dispersions at both 80°F and 150°F. It shows that the amount of polymer may be varied between 30 and 70 pounds per 1,000 gallons of water.

Example 7

This series of tests was similar to those of Example 6 except that a polyacrylamide polymer, prepared according to procedure A was employed. The polymer concentration, type and amount of viscosity reducer, temperature, and viscosity values, obtained as above, employing a Fann viscosimeter at 100 rpm, are set out in Table IV, infra.

Reference to the results of the tests of Example 7 shows that an acrylamide polymer prepared according to Procedure A when dispersed in water to increase the viscosity yields readily to the action of the viscosity reducers employed whereby the viscosity is markedly reduced according to the invention.

Example 8

This series of tests were conducted similarly to those of Examples 6 and 7 except that the polymer employed was carboxymethylhydroxyethyl cellulose in an amount of 30 pounds thereof per 1,000 gallons of water. The temperature of 80°F. The type and amount of viscosity reducer employed and the resulting viscosity values, determined as above, are set out in Table V. The average initial viscosity before adding the additive was 21.8 cps.

TABLE IV.—EFFICACY OF VARIOUS VISCOSITY REDUCING AGENTS ON AQUEOUS POLYMER A DISPERSIONS AT 80°F OR 150°F WHEREIN THE CONCENTRATIONS OF THE POLYMER AND RATIO OF VISCOSITY REDUCING AGENT (ADDITIVE) IS VARIED

| Test identification | Polymer used in lb./1000 gallons of water | Additive used per 1000 gallons of water | Ratio of polymer to additive by weight | Temperature in °F | Viscosity in cps after— | | | |
|---|---|---|---|---|---|---|---|---|
| | | | | | 1 hr. | 4 hrs. | 24 hrs. | 48 hrs |
| g | 30 | None | | *80 | 21.3 | 22.5 | 21.9 | 21.0 |
| 60 | 30 | 0.25 Potassium Periodate | 120 | 80 | 20.1 | 19.2 | 16.8 | 6.0 |
| 61 | 30 | 0.1 Potassium Periodate | 300 | 80 | 21.0 | 20.7 | 20.4 | 20.0 |
| h | 70 | None | | **80 | 58.8 | | 59.1 | 60.0 |
| 62 | 70 | 2 Potassium Periodate | 35 | 80 | 51.6 | 49.0 | 29.4 | 20.4 |
| i | 30 | None | | ***150 | 14.7 | 11.1 | 9.8 | 9.8 |
| 63 | 30 | 0.05 Potassium Periodate | 600 | 150 | 15.0 | 13.8 | 8.7 | 7.0 |
| 64 | 30 | 0.1 Potassium Periodate | 300 | 150 | 10.2 | 10.2 | 8.1 | 7.2 |
| 65 | 30 | 1 Potassium Periodate | 30 | 150 | 2.4 | | | |
| 66 | 30 | 0.05 Hydrazine Sulfate | 600 | 150 | 12.6 | 11.4 | 7.5 | 7.0 |
| 67 | 30 | 0.1 Hydrazine Sulfate | 300 | 150 | 11.4 | 9.6 | 5.7 | 4.2 |
| 68 | 30 | 0.5 Hydrazine Sulfate | 60 | 150 | 11.4 | 8.4 | 2.4 | |
| j | 70 | None | | ****150 | 34.2 | 33.0 | 32.3 | 30.0 |
| 69 | 70 | 0.1 Potassium Periodate | 700 | 150 | 29.4 | 27.0 | 22.2 | 17.1 |
| 70 | 70 | 0.5 Potassium Periodate | 350 | 150 | 29.4 | 27.0 | 21.9 | 16.6 |
| 71 | 70 | 1 Potassium Periodate | 70 | 150 | 6.9 | 3.6 | | |
| 72 | 70 | 0.05 Ammonium Persulfate | 1400 | 150 | 31.2 | 25.2 | 14.4 | 13.2 |
| 73 | 70 | 0.1 Ammonium Persulfate | 700 | 150 | 24.6 | 14.1 | 8.4 | 8.7 |
| 74 | 70 | 0.5 Ammonium Persulfate | 140 | 150 | 15.3 | 7.5 | 3.0 | |
| 75 | 70 | 1 Ammonium Persulfate | 70 | 150 | 12.0 | 5.7 | 3.0 | |
| 76 | 70 | 0.5 Hydrazine Sulfate | 140 | 150 | 32.1 | 28.8 | 15.0 | 7.8 |

*Initial viscosity of 30 lbs. of polymer per 1000 gallons of water at 80°F was 21.6 cps.
**Initial viscosity of 70 lbs. of polymer per 1000 gallons of water at 80°F was 61.8 cps.
***Initial viscosity of 30 lbs. of polymer per 1000 gallons of water at 150°F was 14.3 cps.
****Initial viscosity of 70 lbs. of polymer per 1000 gallons of water at 150°F was 34.2 cps.

TABLE V.—EFFICACY OF VARIOUS VISCOSITY REDUCING AGENTS ON AQUEOUS DISPERSIONS OF CARBOXY-METHYLHYDROXYETHYL CELLULOSE AT 80°F, IN AMOUNT OF 30 POUNDS PER THOUSAND GALLONS OF WATER

| Test identification | Viscosity reducer employed in lb. per 1000 gallons of water | Viscosity in cps after— | | | | | |
|---|---|---|---|---|---|---|---|
| | | 1 hr. | 2.5 hrs. | 4 hrs. | 18 hrs. | 24 hrs. | 48 hrs. |
| k | None | *22.2 | 22.2 | | 21.0 | | 20.8 |
| 77 | 5 Sodium Chromate | 21.0 | 20.4 | | 19.8 | | 18.6 |
| 78 | 5 Hydroxylamine Hydrochloride | 19.9 | 19.2 | | 14.4 | | 9.0 |
| 79 | 5 Potassium Permangate | 19.8 | 12.0 | | 4.0 | | 2.5 |
| 80 | 1 Potassium Permangate | | | 15.0 | | 10.2 | 9.0 |
| 81 | 5 Sodium Chromate | 21.0 | 20.6 | | 18.0 | | 15.0 |
| 82 | 5 Potassium Periodate | 18.0 | 12.0 | | 3.6 | | 2.0 |
| 83 | 1 Potassium Periodate | | | 14.1 | | 6.6 | 6.3 |
| 84 | 5 Potassium Bromate | 21.0 | 20.0 | | 18.6 | | 17.4 |
| 85 | 5 Sodium Peroxide | 19.8 | 18.6 | | 18.0 | | 17.4 |
| 86 | 5 Ammonium Persulfate | 20.4 | 19.8 | | 17.4 | | 13.8 |
| 87 | 1 Ammonium Persulfate | | | 20.4 | | 19.5 | 18.3 |
| 88 | 5 Hydrazine Sulfate | 19.2 | 19.0 | | 14.4 | | 6.6 |
| 89 | 1 Hydrazine Sulfate | | | 17.1 | | 7.2 | 5.2 |
| 90 | 5 Phenyl Hydrazine | 21.0 | 15.0 | | 6.0 | | 4.0 |
| 91 | 1 Phenyl Hydrazine | | | 7.5 | | 2.7 | |
| 92 | 3.6 Hydrazine | 13.8 | 8.4 | | 4.2 | | 2.5 |
| 93 | 1 Hydrazine | | | 12.3 | | 8.1 | 6.9 |
| 94 | 0.5 Hydrazine | | | 17.4 | | 13.8 | 12.6 |
| 95 | 2 Hydrogen Peroxide | 21.6 | 20.4 | | 17.4 | | 15.0 |
| 96 | 1 Hydrogen Peroxide | | | 20.1 | | 18.9 | 17.7 |
| 97 | 5 Sodium Perborate | | | 20.4 | | 18.9 | 17.4 |
| 98 | 1 Sodium Perborate | | | 20.1 | | 19.2 | 18.3 |
| 99 | 5 Calcium Hypochlorite | 6.9 | | 2.4 | | | |
| 100 | 1 Calcium Hypochlorite | 10.2 | | 3.9 | | | |

*The initial viscosity per 1000 gallons water was 22.2 cps.

Reference to Example 8 shows that carboxymethylhydroxyethyl cellulose, which is an excellent thickening agent for aqueous liquids, can be made to degrade autogeneously and the aqueous liquid containing it can be therefore desirably lowered in viscosity by admixture therewith of a viscosity reducing agent according to the invention.

Reference to Table VI of Example 9 shows that the practice of the invention, employing the viscosity reducing agent required, results in a sufficiently low viscosity within a relatively short time to permit easy removal of the hydroxyethyl cellulose polymer composition from its emplaced location, as for example, from a geologic formation.

Example 9

This series of tests was similar to those above except that 30 pounds of hydroxyethyl cellulose was used as the polymer per 1,000 gallons of water to increase the viscosity of the resulting aqueous solution with which was also admixed the various viscosity reducers according to the invention. Viscosities were obtained at 80°F. The initial viscosity was 40.8 centipoises. The salient facts and results are set out in Table VI, infra.

Example 10

The procedure of the above Example 9 was repeated employing various polymers, in the amount of 30 pounds per 1,000 gallons of a solution consisting of 80 percent water and 20 percent isopropyl alcohol (by volume) and employing various viscosity reducers in different amounts, according to the invention, at a temperature of 80°F. The significant facts and viscosity values obtained are set out in Table VII, infra.

TABLE VI.—DEGRADATION OF HYDROXYETHYL CELLULOSE USING OXIDIZERS AND AMINE AGENTS AT VARIED TEMPERATURE AND CONCENTRATION VALUES

Test Apparatus: Fann Viscosimeter.
Procedure: The Hydroxyethyl Cellulose was added to the water and agitated with a Palo stirrer until fully hydrated. The Viscosity Reducer was added and agitated until dissolved or dispersed. The viscosity was measured prior to adding the Viscosity Reducer and periodically thereafter.

| Test identification | Polymer in pounds per 1000 gallons | Additive in lb./1000 gallons | Ratio of polymer to additive | Temperature in °F | Viscosity in cps after— | | | |
|---|---|---|---|---|---|---|---|---|
| | | | | | 1 hr. | 4 hrs. | 24 hrs. | 48 hrs. |
| l | 30 | None | | 80 | 39.5 | 39.5 | 40.0 | 39.9 |
| 101 | 30 | Ammonium Persulfate, 0.25 | 120 | 80 | 30.0 | 18.0 | 4.5 | 2.4 |
| 102 | 30 | Phenylhydrazine, 0.25 | 120 | 80 | 4.2 | | | |
| 103 | 30 | Phenylhydrazine, 0.1 | 300 | 80 | 13.8 | 12.0 | 8.4 | 8.0 |
| 104 | 30 | Phenylhydrazine, 0.05 | 600 | 80 | 20.1 | 18.6 | 13.4 | 13.0 |
| 105 | 30 | Potassium Periodate, 1.0 | 30 | 80 | 32.4 | 32.1 | 29.4 | 28.0 |
| 106 | 30 | Potassium Periodate, 0.25 | 120 | 80 | 34.8 | 35.4 | 33.0 | 32.0 |
| m | 70 | None | | 80 | | | | 234.0 |
| 107 | 70 | Phenylhydrazine, 0.1 | 700 | 80 | | | 222.0 | 216.0 |
| 108 | 70 | Potassium Periodate, 2 | 35 | 80 | | | 190.0 | 180.0 |
| 109 | 70 | Potassium Periodate, 0.25 | 280 | 80 | | | 225.0 | 192.0 |
| 110 | 30 | None | | 125 | | 23.5 | 22.8 | 21.0 |
| 111 | 30 | Phenylhydrazine, 0.1 | 300 | 125 | 3.3 | | | |
| 112 | 30 | Potassium Periodate, 0.25 | 120 | 125 | 14.4 | 14.1 | 13.5 | 12.0 |
| n | 70 | None | | 125 | 158 | 149 | 140 | 148 |
| 113 | 70 | Calcium Hypochlorite, 5 | 14 | 125 | 52 | 6.0 | | |
| 114 | 70 | Calcium Hypochlorite, 1 | 70 | 125 | 120 | 90 | 63 | 60 |
| 115 | 70 | Hydrazine Sulfate, 1 | 70 | 125 | 142 | 126 | 20.4 | 9.6 |
| 116 | 70 | Hydrazine Sulfate, 0.25 | 280 | 125 | 154 | 141 | 123 | 117 |
| 117 | 70 | Potassium Periodate, 1 | 70 | 125 | 148 | 126 | 105 | 105 |
| 118 | 70 | Potassium Periodate, 0.25 | 280 | 125 | 152 | 135 | 126 | 120 |
| 119 | 70 | Potassium Periodate, 2.0 | 35 | 125 | 109 | 84.6 | 82.2 | 80 |
| 120 | 70 | Phenylhydrazine, 0.1 | 700 | 125 | 108 | 95.4 | 57.0 | 48.6 |

TABLE VII.—EFFICACY OF VARIOUS VISCOSITY REDUCING AGENTS ON 80% WATER–20% ALCOHOL DISPERSIONS OF VARIOUS POLYMERS AT 80°F

| Test identification | Polymer and concentrate in lb./1000 gallons | Additive in lb./1000 gallons | Fann viscosity in cps after— | | | | |
|---|---|---|---|---|---|---|---|
| | | | 1 hr. | 2 hrs. | 4 hrs. | 24 hrs. | 48 hrs. |
| o | 30 Hydroxyethyl cellulose | None | *47.4 | 48.6 | 49.2 | | 52.8 |
| 121 | do | Phenylhydrazine, 5 | 45.0 | 42.0 | 46.8 | | 27.0 |
| 122 | do | Hydrazine Sulfate, 5 | 49.2 | 49.8 | 51.0 | | 55.8 |
| 123 | do | Hydroxylamine Hydrochloride, 5 | 50.4 | 51.0 | 52.2 | | 54.6 |
| 124 | do | Ammonium Persulfate, 5 | 50.4 | 49.2 | 46.8 | | 39.0 |
| 125 | do | Potassium Permangate, 5 | 42.0 | 34.2 | 30.0 | | 24.0 |
| 126 | do | Potassium Periodate, 5 | 48.6 | 40.8 | 21.8 | | 3.0 |
| p | 30 Polyacrylamide made by Procedure B. | None | **66.3 | | 66.6 | 66.0 | 65.0 |
| 127 | do | Hydrazine, 5 | 66.9 | | 66.9 | 65.0 | 63.0 |
| 128 | do | Hydrazine, 5 + 50 ppm FeCl$_2$ | 60.0 | | | 61.8 | 61.2 |
| 129 | do | Phenylhydrazine, 5 | 64.8 | | 63.6 | 57.6 | 57.6 |
| 130 | do | Hydrazine Sulfate, 5 | 55.8 | | 56.4 | 53.4 | 53.4 |
| 131 | do | Hydrazine Sulfate 5 + 50 ppm FeCl$_2$. | | 44.4 | | 36.6 | 30.6 |
| 132 | do | Hydrazine Sulfate, 5 + 50 ppm FeCl$_3$. | | 43.2 | | 32.4 | 26.4 |
| 133 | do | Hydroxylamine Hydrochloride, 5 | 55.2 | | 55.8 | | 35.4 |
| 134 | do | Hydroxylamine Hydrochloride, 5 + 50 ppm FeCl$_2$. | | 18.0 | | 10.8 | 6.0 |
| 135 | do | 50 ppm FeCl$_3$ | | 60.0 | | 61.8 | 61.2 |
| 136 | do | 50 ppm FeCl$_3$ | | 57.6 | | 61.8 | 61.8 |
| 137 | do | Potassium Periodate, 5 | 66.9 | | 65.5 | | 65.0 |
| q | 30 Carboxymethylhydroxyethyl cellulose. | None | 30.0 | | 33.0 | 31.2 | 33.0 |
| 138 | do | Potassium Periodate, 5 | 31.2 | | 31.8 | 17.1 | 7.8 |
| 139 | do | Potassium Periodate, 1 | 30.3 | | 32.7 | 28.5 | 27.0 |

*Initial viscosity of 30 pounds of hydroxyethyl cellulose polymer per 1000 gallons of water was 48 cps.
**Initial viscosity of 30 pounds of polyacrylamide made by Procedure A was 66.6 cps.

Reference to Table VII shows that solutions of water and water-miscible alcohols containing polymeric thickening or gelling agents can be prepared so that the viscosity will, as a matter of course, drop within a short time, by admixing with the polymer dispersion a small but effective amount of a hydrazine or hydroxylamine alone or unexpectedly in combination with FeCl$_2$ or FeCl$_3$.

Example 11

A temporary plug was inserted and degraded in accordance with the invention as follows:

A polymer plugging composition was prepared by admixing (a) a premix of 90 percent guar gum, 8 percent NaHCO$_3$, and 2 percent polyacrylamide with water, in an amount sufficient to provide 500 pounds thereof per 1,000 gallons of resulting composition and (b) 15 pounds of sodium dichromate and (c) 2 pounds of potassium bromate per 1,000 gallons of composition, as a viscosity reducer (gel breaker) in accordance with the invention.

The composition so made was injected down a well, penetrating a geologic formation, and emplaced therein where a temporary diverting plug was desired. The so emplaced composition gelled to a solid plugging material which prevented the passage of fluid therethrough for a period of about 4 days. Thereafter the plug degenerated and fluid flow was restored.

A polyacrylamide polymer when used in the treatment of a geologic formation traversed by a well as a diverting agent for injected fluid, had been known to resist removal thereafter and interfere with fluid flow in the formation. In this example, no problem of that nature could occur.

Example 12

In this example the use of adipic dihydrazide (I) and sebacic dihydrazide (II) as breakers for polyacrylamide (PA) (molecular weight of between about 2 and 3 million) and hydroxyethyl cellulose (HEC) thickened aqueous solution is illustrated. As the data in the following Table VIII shows both breakers are effective in breaking the thickened solutions. As noted hereinbefore some breakers are more effective in breaking with certain polymers, i.e., at 80°F both breakers more effectively broke the HEC than the PA solution. But at higher temperatures (125°F) the breakers were more effective in breaking the PA solution.

TABLE VIII

| Gelling agent and conc. (lbs./1000 gal.) | Breaker and conc. (lbs./1000 gals.) | Temp. (°F) | Viscosity (cps) | | | | |
|---|---|---|---|---|---|---|---|
| | | | Initial | 1 hr. | 18 hrs. | 23 hrs. | 72 hrs. |
| AP 30 lbs | None | 80 | 48.0 | 51.0 | 51.0 | 48.0 | 46.2 |
| Do | I 5 lbs | 80 | 48.0 | 51.0 | 48.0 | 40.8 | 36.6 |
| Do | do | 125 | 40.8 | 42.0 | 24.0 | 22.2 | 6.0 |
| Do | | | | | | | |
| Do | II 5 lbs | 80 | 48.0 | 51.0 | 48.0 | 40.8 | 36.0 |
| Do | do | 125 | 40.8 | 42.6 | 30.0 | 26.8 | 12.0 |
| Do | None | 125 | 40.8 | 42.0 | 42.0 | 41.0 | 36.0 |
| HEC 30 lbs | do | 80 | 42.0 | 42.0 | 42.0 | 39.0 | 32.4 |
| Do | I 5 lbs | 80 | 42.0 | 39.6 | 24.0 | 16.2 | 4.2 |
| Do | do | 125 | 22.0 | 25.0 | 3.0 | 2.4 | |
| Do | None | 125 | 22.0 | 22.0 | 18.0 | 14.4 | |
| Do | II 5 lbs | 80 | 42.0 | 39.0 | 22.2 | 13.6 | 4.2 |
| Do | do | 125 | 22.0 | 14.4 | 3.4 | 1.8 | |

The invention has utility in any instance where a temporary plugging or lessening or inhibition of fluid flow is desirable, e.g., in hydraulic fracturing (where the polymer is desirable to aid in suspending a proppant) and in cementing a subterranean formation wherein temporary fluid loss control is devised and during drilling to shut off water intrusion, thereby not permanently lessening the permeability of the formation after following a short period during which the polymer employed degrades.

It will be apparent to those knowledgeable of the nature and properties of water dispersible polymers that other such polymers than those employed in the examples hereof can be used, including any one or combination of those named herein. Similarly, other amines of the nature of those used in the examples, and other peroxides of the nature of those used in the examples can be used as the viscosity reducer in the practice of the invention.

What is claimed is:

1. A water base polymer thickened hydraulic fracturing composition which comprises:
   a. water;
   b. a sufficient amount of a water-soluble organic polymer additament having a molecular weight of at least about 100,000 which functions when present in an amount ranging from about 0.1 to about 2 percent by weight of the resulting aqueous solution to increase the viscosity of the resulting aqueous solution to about 10 to about 5,000 centipoise at a temperature of about 25°C. as determined with a Fann viscometer at 100 rpm, said polymeric additament being selected from the group consisting of acrylamide polymers and copolymers, polyvinyl pyrrolidone, polyvinyl morpholinone, cellulose ethers, natural gums and modified starches and
   c. a sufficient amount of a water soluble hydroxylamine compound, a water soluble hydrazine compound or a mixture thereof to decrease the viscosity of the viscous aqueous solution to a value which is less than the initial viscosity and at least 15 centipoise or less within at least about 72 hours at the ambient temperature of the location of the viscous aqueous composition, said hydrazine, compound being selected from the group consisting of hydrazine, phenylhydrazine, hydrazine monochloride, hydrazine dihydrochloride, dihydrazine disulfate, monohydrazine sulfate, hydrazine disulfate, stearic dihydrazide, succinyl dihydrazide, adipic dihydrazide, copper dihydrazinium sulfate, hydrazinium dihydrobromide, dihydrazine oxalate, hydrazinium acid adipate, zinc dihydrazine sulfate, zinc dihydrazine chloride, cobalt dihydrazine chloride, sebacic dihydrazide, zinc dithiocarbazinate, carbohydrazide, dihydrazine acid phosphate, hydrazine borate, copper hydrazinium phosphate-copper sulfate complex, copper sulfate--hydrazine bromide complex, copper sulfate-hydrazine oxalate complex, thiosemicarbazide, hydrazine adipic acid acetone complex, cinnamalazine, glyoxal-di-para-nitrophenyl hydrazine, 2,4-dinitrophenylhydrazine acetate, benzalazine, 2,4-dichlorobenzalazine, α-naphthalazine, hydrazinium n--butyl phosphate, hydrazinium methyl phosphate, hydrazinium isopropyl phosphate, tetrahydrazinium pyrophosphate, monohydrazine phosphate, dihydrazinium phosphate, monohydrazinium dihypophosphite, N,N'-diphenyl carbamyl hydrazide, monomethyl-hydrazine sulfate, 2,4-dichloro-6-(o-chloroaniline)-s-triazine, dihydrazine tartrate, or zinc dimethylhydrazine chloride and said hydroxylamine being selected from the group consisting of hydroxylamine hydrochloride, $(NH_3OH)Cl$, $(NH_3OH)_2SO_4$, $(NH_3OH)HSO_4$, $(NH_3OH)_3PO_4$, $(NH_3OH)_3AsO_4$, $(NH_3OH)SO_3NH_2$, $(NH_3OH)ClO_4$, $(NH_3OH)I$, $(NH_3OH)_2SiF_6 \cdot 2H_2O$, $(NH_3OH)_2SnCl_6$, $(NH_3OH)Al(SO_4)_2 \cdot 12H_2O$, $(NH_3OH)Fe(SO_4)_2 \cdot 12H_2O$, $(NH_3OH)Cr(SO_4)_2 \cdot 12H_2O$, $(NH_3OH)_2Mg(SO_4)_2 \cdot 6H_2O$, $(NH_3OH)_2UO_4 \cdot H_2O$, $(NH_3OH)(C_2H_5)SO_4$, $(Mg(NH_2OH)_2Cl_2 \cdot 2H_2O$, $(Ca(NH_2OH)_2)Cl_2$ $(Mn(NH_2OH)_2)Cl_2$, $(Co(NH_2OH)_6)Cl_3$, $(Co(NH_2OH)_6)(ClO_4)_3$, $(Co(NH_2OH)_6)(CNS)_3$, $(Zn(NH_2OH)_2)Cl_2$, $(Zn(NH_2OH)_2)CO_3$, $(Cd(NH_2OH)_2)Cl_2$, $(Ba(NH_2OH)_2)Cl_2$, $(Hg(NH_2OH)_2)Cl_2$, $(Hg(NH_2OH)_2)SO_4 \cdot H_2O$, $(Pd(NH_2OH)_4)Cl_2$, $(Pt(NH_2OH)_4)(OH)_2$, $(Pt(NH_2OH)_2(NH_3)_2)$, $Cl_2$, $(Pt(NH_2OH)_4)Cl_2(Pt(NH_2OH)_2(py)_2)PtCl_4$, or $(Pt(NH_2OH)_4Br_2$.

2. The composition of claim 1 wherein the water soluble organic polymer is an acrylamide polymer.

3. The composition of claim 1 wherein the water soluble organic polymer is a cellulose ether.

4. The composition of claim 1 wherein the water soluble organic polymer is derived from a natural occurring gum.

5. The composition of claim 1 wherein the water soluble organic polymer is an acrylamide polymer, the hydroxylamine is hydroxylamine hydrochloride, the hydrazine is hydrazine sulfate, said hydrazine and hydroxylamine being present in an amount ranging from about 0.03 to about 20 parts by weight per 100 parts by weight of said acrylamide polymer, and wherein the composition includes in addition isopropyl alcohol and $FeCl_2 FeCl_3$ or mixtures of $FeCl_2$ or $FeCl_3$ in an amount sufficient to reduce the viscosity of the composition to said value within said length of time.

6. The composition of claim 1 which consists essentially of
   a. water;
   b. a water soluble organic polymer consisting of polyvinylpyrrolidone, polyvinylmorpholinone, an acrylamide polymer, a cellulose ether, a natural gum or mixture thereof; and
   c. a sufficient amount of said hydroxylamine, or hydrazine compound or mixture thereof to decrease the viscosity of said composition to a value not to exceed about 15 centipoise as measured by Fann viscosimeter at 100 rpm and a temperature of 25°C. within about 72 hours.

7. The composition of claim 1 wherein the water soluble polymer is an acrylamide polymer having a portion of the amide groups hydrolyzed to carboxyl groups and said hydrazine compound is hydrazine, hydrazine sulfate, or phenyl hydrazine and the hydroxylamine compound is hydroxylamine hydrochloride.

8. The composition of claim 1 wherein the molecular weight of the polymer ranges from about 1 million to about 2 million.

9. The composition of claim 1 wherein the water soluble polymer is carboxymethyl hydroxyalkyl cellulose ether.

10. The composition of claim 1 wherein said hydroxylamine, hydrazine or mixture of said compounds is present in an amount ranging from about 0.03 to about 20 parts per 100 parts by weight of said organic polymeric additament.

* * * * *